W. J. KELLAR.
Band-Cutter.

No. 213,758.          Patented April 1, 1879.

Witnesses:      Inventor:
Frank W. Heers,     William J. Kellar,
Erastus W. Smith.   By Thomas G. Orwig,
                            Attorney.

UNITED STATES PATENT OFFICE.

WILLIAM J. KELLAR, OF DAVIS, ILLINOIS.

IMPROVEMENT IN BAND-CUTTERS.

Specification forming part of Letters Patent No. 213,758, dated April 1, 1879; application filed December 2, 1878.

*To all whom it may concern:*

Be it known that I, WILLIAM J. KELLAR, of Davis, in the county of Stephenson and State of Illinois, have invented an Improved Band-Cutter, of which the following is a specification:

The object of my invention is furnish a tool that is adapted to be used for cutting the wire bands, and also the straw bands, of sheaves of grain previous to feeding the same to a thrashing-machine.

It consists in forming a wire-cutting tool of the pincher-form order, and adapting it to carry a straw-cutting blade, as hereinafter fully set forth.

Figure 1:
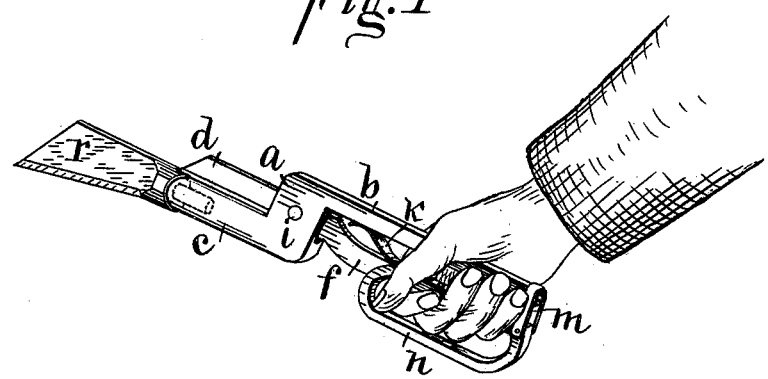
Figure 2:
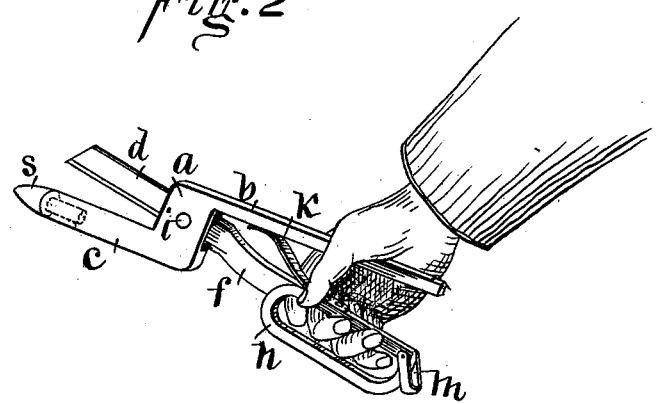

Figure 1 of my drawings is a perspective view, showing my tool adapted to be used for cutting straw bands. Fig. 2 is a perspective view, showing it adapted for cutting wire bands. Jointly considered, they fully illustrate the construction and operation of my complete invention.

$a$ represents the body of my tool. $b$ is a leg, extending rearward and at right angles from the upper rear corner of the body. $c$ is a round and tapering jaw, extending forward at right angles from the front and lower corner of the body. This body, leg, and jaw may be formed by casting it complete in one piece; or the leg and jaw may be formed separately, and rigidly attached to the body in any suitable way. $d$ is a cutting-blade, passed forward through a mortise formed in the body $a$. It has a handle, $f$, extending rearward and inclined downward; and the combined cutting-blade and handle is pivoted to the body $a$ by means of a rivet, $i$, passed through the body and the shank of the cutter $d$, as shown. $k$ is a spring fixed on the top edge of the handle $f$, to engage the under side of the leg or mating handle $b$, and to hold the handles, the jaw $c$, and the cutter $d$ apart when in its normal position. $m$ is a loop hinged to the rear end of the handle, to engage the end of the leg $b$, and to lock the jaw and cutter together when the tool is used to cut straw bands. $n$ is a fender on the under side of the handle $f$, through which the fingers of the operator are passed. It serves to protect the fingers and prevents the tool from slipping in the hand when it is manipulated to cut bands. $r$ in Fig. 1 represents a blade, adapted in form for cutting straw bands, fixed to the front end of the jaw $c$ by means of a screw-shank entering the jaw, as indicated by dotted lines. $s$ in Fig. 2 is a point, of conoidal form, that is substituted for the cutting-blade $r$ when the tool is to be used to cut wire bands.

My complete invention is thus specially adapted to be alternately used for cutting straw and wire bands, as occasion may require.

I claim—

1. As an improved article of manufacture, a band-cutter composed of the body $a$, having a leg, $b$, and jaw $c$, adapted to carry a removable plate or joint, and the pivoted cutting-blade and handle $d f$, having a spring, $k$, loop $m$, and fender $n$, substantially as shown and described, to be operated as set forth.

2. The removable point $s$, in combination with the jaw $c$ of a band-cutter.

WILLIAM J. KELLAR.

Witnesses:
FREDERICK BUTICEFER,
WM. KELLER.